US008968967B2

(12) United States Patent
Merzougui et al.

(10) Patent No.: US 8,968,967 B2
(45) Date of Patent: Mar. 3, 2015

(54) FUEL CELL CATALYST SUPPORT WITH FLUORIDE-DOPED METAL OXIDES/PHOSPHATES AND METHOD OF MANUFACTURING SAME

(75) Inventors: Belabbes Merzougui, Manchester, CT (US); Minhua Shao, Manchester, CT (US); Lesia V. Protsailo, Bolton, CT (US)

(73) Assignee: Ballard Power Systems Inc., Burnaby (CA)

( * ) Notice: Subject to any disclaimer, the term of this patent is extended or adjusted under 35 U.S.C. 154(b) by 485 days.

(21) Appl. No.: 13/057,198

(22) PCT Filed: Sep. 17, 2008

(86) PCT No.: PCT/US2008/076577
§ 371 (c)(1),
(2), (4) Date: Feb. 2, 2011

(87) PCT Pub. No.: WO2010/033111
PCT Pub. Date: Mar. 25, 2010

(65) Prior Publication Data
US 2011/0136046 A1 Jun. 9, 2011

(51) Int. Cl.
*H01M 4/02* (2006.01)
*H01M 4/90* (2006.01)
*H01M 4/86* (2006.01)
*H01M 4/88* (2006.01)
(Continued)

(52) U.S. Cl.
CPC .............. *H01M 4/90* (2013.01); *H01M 4/8663* (2013.01); *H01M 4/8821* (2013.01); *H01M 4/9075* (2013.01); *H01M 4/92* (2013.01); *H01M 4/925* (2013.01); *H01M 2008/1095* (2013.01); *Y02E 60/50* (2013.01)
USPC ........... 429/523; 429/524; 429/525; 429/526; 429/527; 429/528; 429/532

(58) Field of Classification Search
None
See application file for complete search history.

(56) References Cited

U.S. PATENT DOCUMENTS

| 4,643,957 A | 2/1987 | Takeuchi et al. |
| 5,112,706 A * | 5/1992 | Pinsky et al. ................. 429/233 |

(Continued)

FOREIGN PATENT DOCUMENTS

| EP | 0248386 | * | 9/1987 | .............. H01M 4/58 |
| EP | 1 883 131 A1 | | 1/2008 | |

(Continued)

OTHER PUBLICATIONS

Kathryn Young, Canwest News Services, "Minature Fuel Cell Harnesses the Power of Bee Venom", Sunday, Dec. 23, 2007.*
(Continued)

*Primary Examiner* — Patrick Ryan
*Assistant Examiner* — Carmen Lyles-Irving
(74) *Attorney, Agent, or Firm* — Seed IP Law Group PLLC

(57) ABSTRACT

A fuel cell catalyst support includes a fluoride-doped metal oxide/phosphate support structure and a catalyst layer, supported on such fluoride-doped support structure. In one example, the support structure is a sub-stechiometric titanium oxide and/or indium-tin oxide (ITO) partially coated or mixed with a fluoride-doped metal oxide or metal phosphate. In another example, the support structure is fluoride-doped and mixed with at least one of low surface carbon, boron-doped diamond, carbides, borides, and silicides.

9 Claims, 3 Drawing Sheets

(51) Int. Cl.
*H01M 4/92* (2006.01)
*H01M 8/10* (2006.01)

(56) References Cited

U.S. PATENT DOCUMENTS

| | | | |
|---|---|---|---|
| 5,677,074 | A | 10/1997 | Serpico et al. |
| 5,783,325 | A | 7/1998 | Cabasso et al. |
| 6,811,911 | B1 | 11/2004 | Peled et al. |
| 6,828,056 | B2 | 12/2004 | Molter et al. |
| 6,884,290 | B2 | 4/2005 | Swain et al. |
| 7,108,773 | B2 | 9/2006 | Masel et al. |
| 7,129,194 | B2 | 10/2006 | Baca et al. |
| 2001/0000889 | A1* | 5/2001 | Yadav et al. .......... 204/242 |
| 2003/0166734 | A1* | 9/2003 | Krylova et al. .......... 518/715 |
| 2003/0166987 | A1* | 9/2003 | Roark .......... 588/205 |
| 2004/0221796 | A1 | 11/2004 | Swain et al. |
| 2005/0112451 | A1 | 5/2005 | Lee et al. |
| 2006/0134507 | A1 | 6/2006 | Park et al. |
| 2006/0175953 | A1 | 8/2006 | Swain et al. |
| 2006/0188775 | A1 | 8/2006 | Mance et al. |
| 2006/0257719 | A1 | 11/2006 | Merzougui et al. |
| 2007/0248862 | A1 | 10/2007 | Park et al. |
| 2007/0281204 | A1 | 12/2007 | Uensal et al. |
| 2008/0014494 | A1* | 1/2008 | Iordache et al. .......... 429/40 |
| 2008/0166623 | A1* | 7/2008 | Cendak et al. .......... 429/44 |
| 2008/0194400 | A1* | 8/2008 | Schmidt .......... 502/223 |

FOREIGN PATENT DOCUMENTS

| | | |
|---|---|---|
| JP | 2000-48833 A | 2/2000 |
| JP | 2002-200427 A | 7/2002 |
| JP | 2002-246033 A | 8/2002 |
| KR | 2006-0071555 A | 6/2006 |
| WO | 2010/033111 A1 | 3/2010 |
| WO | 2010/033121 A1 | 3/2010 |

OTHER PUBLICATIONS

WO 2008006210 (Abstract & Detailed Description) (a raw machine translation) (Jan. 17, 2008).*
International Preliminary Report on Patentability for International application No. PCT/US2008/076577 mailed Mar. 31, 2011.
International Search Report for PCT Application No. PCT/US2008/076577, Mar. 31, 2009.
International Preliminary Report on Patentability, issued Mar. 22, 2011, for International Application No. PCT/US2008/076948, 4 pages.
International Preliminary Report on Patentability, issued Aug. 16, 2011, for International Application No. PCT/US2009/033609, 4 pages.
International Search Report, mailed Sep. 29, 2009, for International Application No. PCT/US2009/033609, 3 pages.
International Search Report and Written Opinion, mailed Mar. 31, 2009, for International Application No. PCT/US2008/076948, 10 pages.

* cited by examiner

FUEL CELL CATALYST SUPPORT WITH FLUORIDE-DOPED METAL OXIDES/PHOSPHATES AND METHOD OF MANUFACTURING SAME

TECHNICAL FIELD

This disclosure relates to fuel cell catalyst supports and methods of manufacturing the same.

BACKGROUND

Cost and durability issues have made it difficult to commercialize fuel cells. Fuel cells utilize a catalyst that creates a chemical reaction between a fuel, such as hydrogen, and an oxidant, such as oxygen, typically from air. The catalyst is typically platinum loaded onto a support, which is usually a high surface area carbon.

Some durability issues are attributable to the degradation of the support caused by corrosion. Electrochemical studies have indicated that the corrosion depends strongly on surface area and morphology structure of carbon. For example, it has been reported that carbon with high surface area, such as Ketjen Black, can corrode severely at potentials experienced during start and stop cycling of the fuel cell causing a dramatic loss in fuel cell performance. Accordingly, to overcome this particular durability issue, it may be desirable to use a support other than carbon that is more chemically and electrochemically stable.

One possible alternative support for a catalyst is a metal oxide. Metal oxides can typically have a high surface area and good corrosion resistance, which are desirable for fuel cell applications. However, most of these high surface area metal oxides are not conductive, and are extremely hydrophilic. Hydrophilic supports can cause problems, such as electrode flooding, which leads to a significant drop in cell performance, especially at high current densities. As a result, metal oxide supports have not been applied in low temperature fuel cells.

What is therefore needed is a modified metal oxide that is suitable for use in a fuel cell environment.

SUMMARY

A fuel cell catalyst support is disclosed that includes a fluoride-doped metal oxide/phosphate support structure and a catalyst layer, supported on such fluoride-doped metal oxide/phosphate. In one example, the metal oxide/phosphate support structure is a sub-stechiometric titanium oxide and/or indium-tin oxide (ITO) partially coated or mixed with a fluoride-doped metal oxide/phosphate. In another example, the metal oxide/phosphate is fluoride-doped and mixed with at least one of low surface carbon, boron-doped diamond, carbides, borides and silicides.

These and other features of the disclosure can be best understood from the following specification and drawings, the following of which is a brief description.

DETAILED DESCRIPTION

Figure 1:
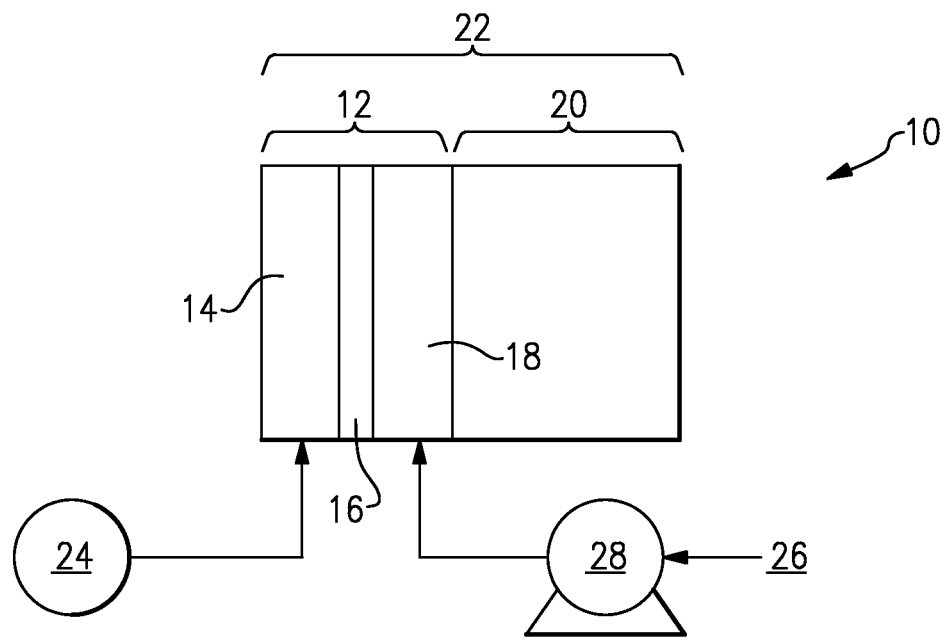
FIG. 1 is a highly schematic view of an example fuel cell.

An example fuel cell 10 is schematically illustrated in FIG. 1. The fuel cell 10 includes a cell 12 having an anode 14 and a cathode 18 arranged about a proton exchange membrane 16. The anode 12 receives a fuel, such as hydrogen, from a fuel source 24. A pump 28 supplies an oxidant, such as air, from an oxidant source 26 to the cathode 18. In the example, the oxidant source 26 is a surrounding environment. The fuel and oxidant react in a controlled chemical process to produce electricity. The cell 12 and other cells 20 are arranged in a cell stack assembly 22, to provide enough electricity to power a load. The fuel cell 10 shown in FIG. 1 is exemplary only and should not be interpreted as limiting the claims.

The anode 14 and cathode 18 typically include a catalyst arranged on a catalyst support. The catalyst support provides the support structure upon which a thin layer of catalyst is deposited. Typically, the catalyst is platinum and the catalyst support is carbon, such as ketjen black, carbon fibers or graphite.

Figure 2:
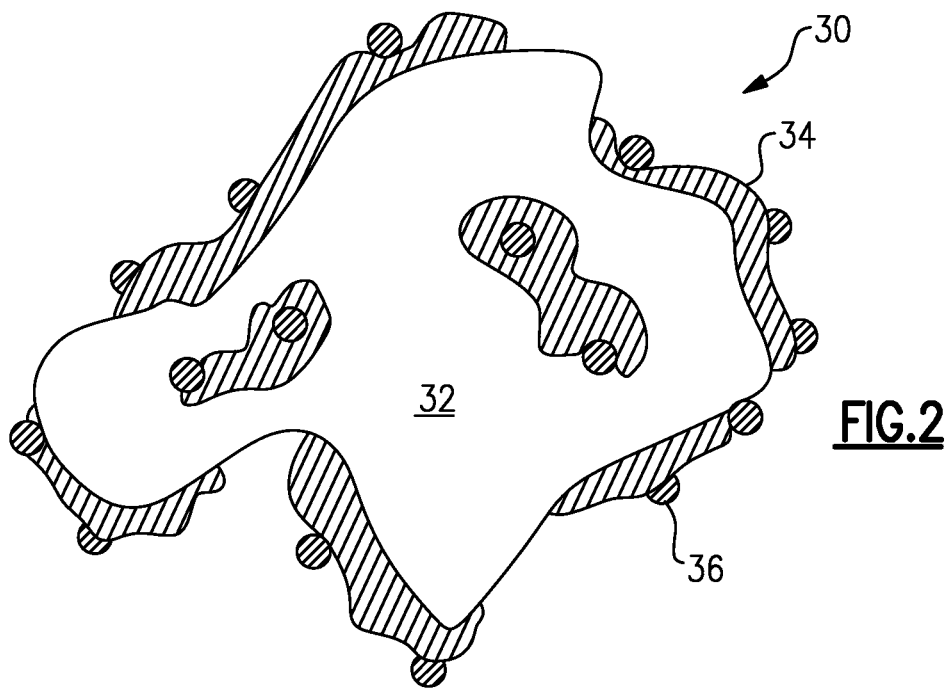
FIG. 2 is a highly schematic view of an example metal oxide/phosphate catalyst support for the fuel cell shown in FIG. 1.

This disclosure relates to a catalyst support 30 having a metal oxide and/or metal phosphate support structure 32, as shown in FIG. 2. Example metal oxides include oxides of titanium (e.g., $TiO_2$ and $Ti_4O_7$), oxides of zirconium ($ZrO_2$), oxides of tungsten ($WO_3$), oxides of tantalum ($Ta_2O_5$), and oxides of niobium ($NbO_2$, $Nb_2O_5$). Other example metal oxides include oxides of yttrium, molybdenum, indium and/or tin (e.g., ITO). Example metal phosphates include TaPOx, TiPIx, and FePOx. Metal oxides/phosphates with a high surface area, are desirable so that the active catalyst layer can be correspondingly increased. Moreover, metal oxides/phosphates are highly corrosion resistant.

Metal oxides/phosphates are hydrophilic, which is undesirable in some applications due to electrode flooding, particularly in the low temperature fuel cells. Metal oxides are also non-conductive. So, catalyst supports typically must be somewhat conductive to ensure electrons at the catalyst layer pass through the support without experiencing an undesirable amount of resistance. As a result, a catalyst support must not be only more hydrophobic but also conductive to be suitable for use in a fuel cell. To this end, a fluoride-doped layer 34 is used with metal oxide/phosphate support structure 32 to support the catalyst layer 36.

While the catalyst support 30 is schematically shown as discrete, uniform layers, it should be understood that catalyst support 30 comprises a fluoride-doped layer 34 arranged between the metal oxide/phosphate support structure 32 and the catalyst layer 36. Example catalysts include noble metals, such as platinum, palladium, gold, ruthenium, rhodium, iridium, osmium, or alloys thereof. A secondary metal can also be used to reduce the amount of noble metal used. Example secondary metals include transition metals, such as cobalt, nickel, iron, copper, manganese, vanadium, titanium, zirconium and chromium.

The catalyst support 30 based on fluoride-doped metal oxides/phosphates includes at least the following examples:

Example 1

Boron Doped Diamond (BDD) as Conductive Matrix

Figure 3:
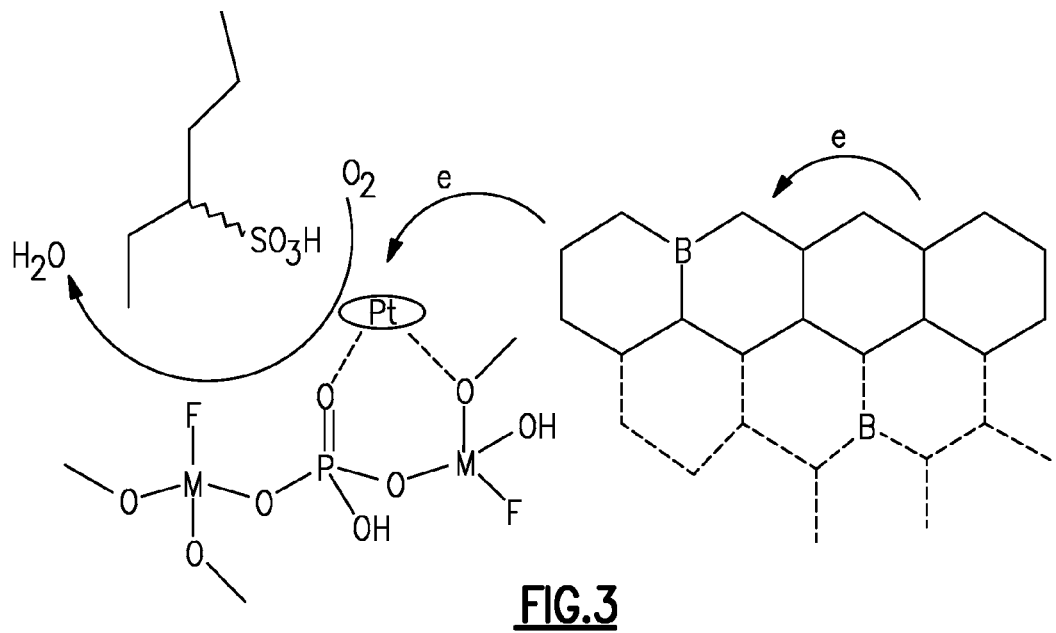
FIG. 3 illustrates a fluoride-doped metal oxide/phosphate having a boron-doped diamond conductive matrix.

In FIG. 3, the fluoride-doped layer 34 is provided by fluoride doping the metal oxide/phosphate support structure 32.

Fluoride doping provides good hydrophobicity that is desirable for water and reactants management in fuel cells. However, fluoride doping may not provide sufficient conductivity. As a result, it may be desirable to mix some conductive and stable materials, such as boron-doped diamond with the fluoride-doped metal oxide/phosphate support structure to provide both desirable hydrophobicity and conductivity. The conductive materials also include but are not limited to low surface area carbon (e.g., carbon fibers), carbides (including metal carbides), borides, and/or silicides.

Example 2

Indium Tin Oxide as Conductive Matrix

Figure 4:
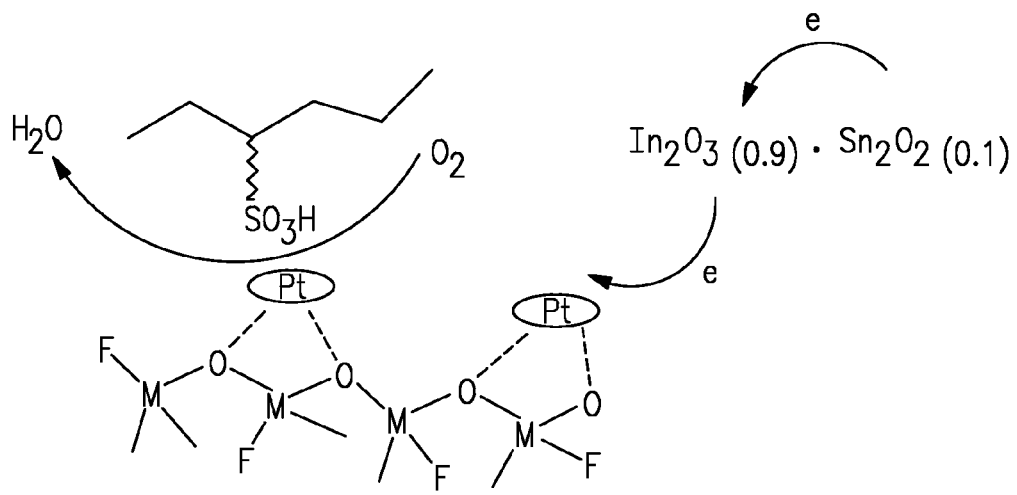
FIG. 4 illustrates a fluoride-doped metal oxide/phosphate having an indium-tin oxide (ITO) conductive matrix.

In FIG. 4, metal oxides such as titanium oxide ($Ti_4O_7$) and/or indium tin oxide (ITO) are used as conductive matrices and the fluoride-doped metal oxides/phosphates are used as the support to provide the hydrophobicity.

Example 3

Fluorinated Carbon as Conductive Matrix

Figure 5:
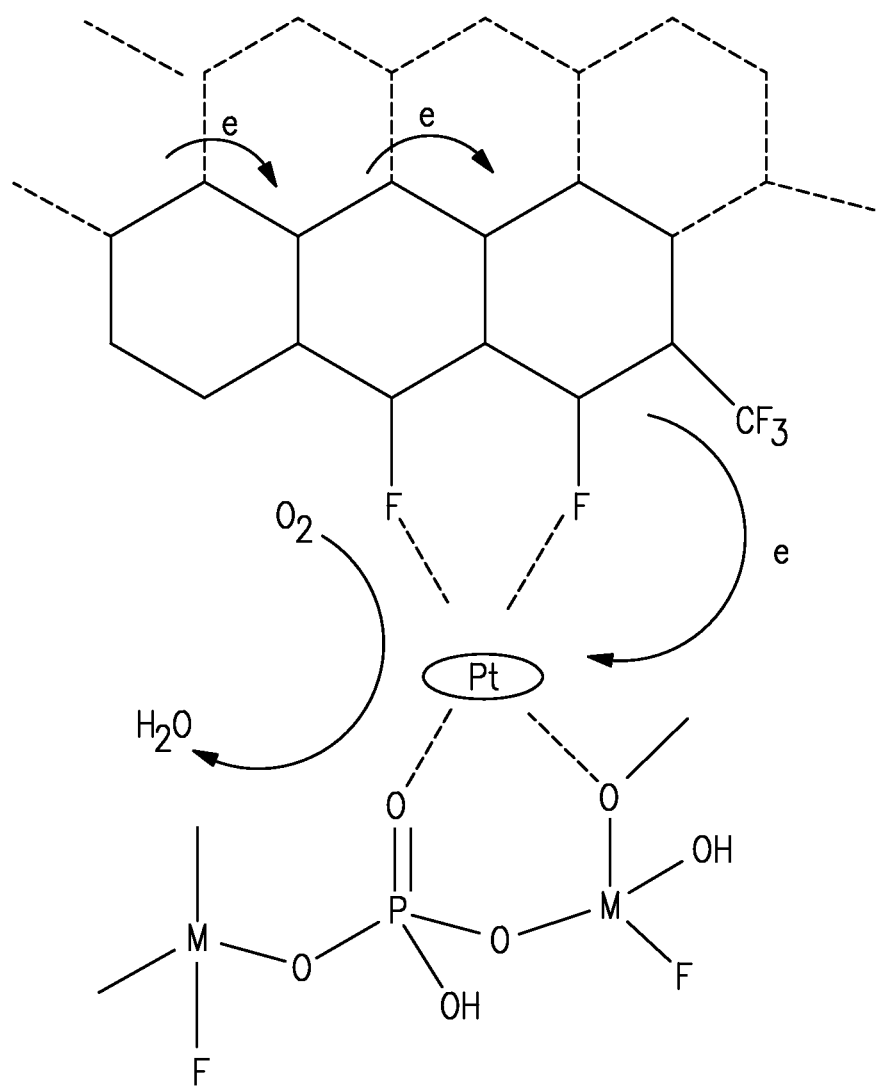
FIG. 5 illustrates a fluoride-doped metal oxide/phosphate having a fluorinated carbon conductive matrix.

In FIG. 5, fluoride-doped metal oxide/phosphates are used as catalyst supports, mixed with conductive fluorinated carbon. This system provides both conductivity and hydrophobicity.

Although an example embodiment has been disclosed, a worker of ordinary skill in this art would recognize that certain modifications would come within the scope of the claims. For that reason, the following claims should be studied to determine their true scope and content.

The invention claimed is:

1. A fuel cell comprising:
    an anode and a cathode arranged about a proton exchange membrane, at least one of the anode and the cathode including a catalyst support; and
    wherein the catalyst support comprises:
        a support structure including at least one of a metal oxide and a metal phosphate, wherein the metal of the metal oxide and the metal phosphate includes at least one of titanium, zirconium, tungsten, tantalum, niobium, yttrium, molybdenum, indium and tin;
        a fluoride-doped layer on the support structure, wherein the fluoride-doped layer includes a fluorinated carbon; and
        a catalyst layer supported on the fluoride-doped layer, wherein the catalyst layer includes at least one noble metal.

2. A fuel cell comprising:
    an anode and a cathode arranged about a proton exchange membrane, at least one of the anode and the cathode including a catalyst support; and
    wherein the catalyst support comprises:
        a support structure including at least one of a metal oxide and a metal phosphate, wherein the metal of the metal oxide and the metal phosphate includes at least one of titanium, zirconium, tungsten, tantalum, niobium, yttrium, molybdenum, indium and tin;
        a fluoride-doped layer on the support structure, wherein the fluoride-doped layer is mixed with a conductive materials consisting of at least one of a low surface area carbon, boron-doped diamond, carbides, borides, and silicides; and
        a catalyst layer supported on the fluoride-doped layer, wherein the catalyst layer includes at least one noble metal.

3. The fuel cell according to claim 2, wherein the conductive material includes at least one of titanium oxide and indium tin oxide.

4. The fuel cell according to claim 1, wherein the noble metal includes at least one of platinum, palladium, gold, ruthenium, rhodium, iridium, osmium, or alloys thereof.

5. The fuel cell according to claim 1, wherein the catalyst layer includes at least one transition metal.

6. The fuel cell according to claim 5, wherein the transition metal includes at least one of cobalt, nickel, iron, copper, manganese, vanadium, titanium, zirconium and chromium.

7. The fuel cell according to claim 2, wherein the noble metal includes at least one of platinum, palladium, gold, ruthenium, rhodium, iridium, osmium, or alloys thereof.

8. The fuel cell according to claim 2, wherein the catalyst layer includes at least one transition metal.

9. The fuel cell according to claim 8, wherein the transition metal includes at least one of cobalt, nickel, iron, copper, manganese, vanadium, titanium, zirconium and chromium.

* * * * *